United States Patent
Yamane et al.

(10) Patent No.: US 9,074,628 B2
(45) Date of Patent: Jul. 7, 2015

(54) SLIDING COMPONENT

(71) Applicant: TAIHO KOGYO Co., Ltd., Toyota-shi, Aichi (JP)

(72) Inventors: Kyohei Yamane, Toyota (JP); Shingo Goto, Toyota (JP)

(73) Assignee: TAIHO KOGYO CO., LTD. (JP)

( * ) Notice: Subject to any disclaimer, the term of this patent is extended or adjusted under 35 U.S.C. 154(b) by 0 days.

(21) Appl. No.: 14/366,699

(22) PCT Filed: Oct. 30, 2012

(86) PCT No.: PCT/JP2012/077989
§ 371 (c)(1),
(2) Date: Jun. 19, 2014

(87) PCT Pub. No.: WO2013/094315
PCT Pub. Date: Jun. 27, 2013

(65) Prior Publication Data
US 2014/0349898 A1 Nov. 27, 2014

(30) Foreign Application Priority Data
Dec. 22, 2011 (JP) ................... 2011-281752

(51) Int. Cl.
*F16C 33/20* (2006.01)
*F04B 27/08* (2006.01)
(Continued)

(52) U.S. Cl.
CPC .............. *F16C 33/205* (2013.01); *F16C 17/04* (2013.01); *F16C 33/20* (2013.01); *F04B 27/0886* (2013.01);
(Continued)

(58) Field of Classification Search
CPC ..................................... F16C 33/205

USPC ................. 384/12, 13, 26, 42, 625, 907, 908; 92/71
See application file for complete search history.

(56) References Cited

U.S. PATENT DOCUMENTS 5,971,617 A * 10/1999 Woelki et al. ................ 384/295
6,752,065 B2    6/2004 Sugioka et al.
(Continued)

FOREIGN PATENT DOCUMENTS

CN    1265182 A    8/2000
JP    S58080615 U  5/1983
(Continued)

OTHER PUBLICATIONS

International Search Report for International Application PCT/JP2012/077989, date of mailing, Dec. 11, 2012 with English Translation.
(Continued)

*Primary Examiner* — Thomas R. Hannon
(74) *Attorney, Agent, or Firm* — Cantor Colburn LLP

(57) ABSTRACT

A swash plate type compressor is arranged with a plurality of semispherical shoes and a disc shaped swash plate. A resin coating having a honeycomb structure is formed on a surface and a rear surface (sliding surface) of the swatch plate which slides with the shoe. An edge part (top end) of each of the multiple cylinder bodies which forms the resin coating layer are at the same plane and forms a sliding surface which slides with the shoe. In addition, an interior space of each cylinder body forms a storage part of a lubricant and a container part for foreign objects.
The swash plate can be provided with excellent wear resistance, seizure resistance and lubrication retention.

3 Claims, 3 Drawing Sheets

(51) Int. Cl.
    *C10M 103/00*      (2006.01)
    *C10M 103/02*      (2006.01)
    *C10M 103/06*      (2006.01)
    *C10M 107/38*      (2006.01)
    *F16C 17/04*      (2006.01)

(52) U.S. Cl.
    CPC ......... *F05C 2253/12* (2013.01); *F05C 2253/20* (2013.01); *F16C 2360/42* (2013.01); C10M 103/00 (2013.01); C10M 103/02 (2013.01); C10M 103/06 (2013.01); C10M 107/38 (2013.01); *C10M 2201/0413* (2013.01); *C10M 2201/0623* (2013.01); *C10M 2201/0653* (2013.01); *C10M 2201/0663* (2013.01); *C10M 2201/1006* (2013.01); *C10M 2213/023* (2013.01)

(56) References Cited

U.S. PATENT DOCUMENTS

| | | | |
|---|---|---|---|
| 6,921,205 | B2 | 7/2005 | Kanayama et al. |
| 7,331,274 | B2 * | 2/2008 | Sugiura et al. .................. 92/155 |
| 7,878,777 | B2 | 2/2011 | Iwanami et al. |
| 2003/0089223 | A1 | 5/2003 | Sugioka et al. |
| 2003/0111511 | A1 | 6/2003 | Kanayama et al. |
| 2003/0185475 | A1 * | 10/2003 | Iwata et al. .................. 384/420 |
| 2006/0083451 | A1 | 4/2006 | Kawagoe et al. |
| 2008/0050260 | A1 | 2/2008 | Iwanami et al. |
| 2008/0112655 | A1 * | 5/2008 | Kanemitsu et al. ............. 384/13 |
| 2010/0080497 | A1 * | 4/2010 | Jaeger et al. .................. 384/276 |
| 2010/0261625 | A1 | 10/2010 | Hakamata |

FOREIGN PATENT DOCUMENTS

| | | |
|---|---|---|
| JP | H06014538 U | 2/1994 |
| JP | 3047502 B2 | 5/2000 |
| JP | 2003138287 A | 5/2003 |
| JP | 2004211859 A | 7/2004 |
| JP | 3918516 B2 | 5/2007 |
| JP | 2008088846 A | 4/2008 |
| JP | 201112767 A | 1/2011 |
| JP | 4835360 B2 | 12/2011 |
| JP | 5368898 B2 | 12/2013 |
| KR | 20100058609 A | 6/2010 |
| WO | 02075172 A1 | 9/2002 |
| WO | 2009041653 A1 | 4/2009 |

OTHER PUBLICATIONS

Korean Office Action for Korean Patent Application No. 10-2014-7020140; Date of Mailing: Sep. 1, 2014, with English translation.
Chinese Notification of the First Office Action corresponding to Application No. 201280063473.5; Issue Date: Jan. 7, 2015, with English translation.

* cited by examiner

SLIDING COMPONENT

This is the U.S. national stage of application No. PCT/JP2012/77989, filed on 30 Oct. 2012. Priority under 35 U.S.C. §119(a) and 35 U.S.C. §365(b) is claimed from Japanese Application No. 2011-281752, filed 22 Dec. 2011, the disclosure of which is also incorporated herein by reference.

TECHNICAL FIELD

The present invention relates to a siding component. In particular, the present invention relates to a sliding component suitable as a swash plate of a swash plate type compressor.

BACKGROUND ART

Conventionally, a swash plate type compressor for an automobile is a known technology. The following structure has been proposed for preventing seizure between a shoe and the swash plate in this conventional swash plate type compressor. That is, forming an end surface of the shoe which slides with the swash plate into a mid to high shape whereby the center part slightly convexes or forming a coating layer on the surface of the swash plate which slides with the shoe has been proposed (patent document 1 for example). In addition to forming a coating layer on the surface of the swash plate, forming multiple concentric ring shaped grooves and ring shaped peaks has also been proposed (patent document 2 for example). In patent document 2, initial affinity and retention of lubrication is improved by arranging multiple concentric ring shaped grooves and ring shaped peaks. In addition, forming regular dents and indents on the surface of a thrust bearing has also been proposed in order to improve the sliding properties of a thrust bearing as a sliding component (patent document 3 and 4 for example).

CITATION LIST

Patent Literature

Patent Document 1: Japanese Laid Open Patent 2003-138287
Patent Document 2: International Published Patent WO2002-075172
Patent Document 3: Japanese Unexamined Utility Model Application H06-014538
Patent Document 4: Japanese Laid Open Patent 2008-088846

SUMMARY OF THE INVENTION

Problems to be Solved by the Invention

Many of the swash plate type compressors installed in recent automobiles are crutchless types and therefore the swash plate type compressor also usually rotates when the engine is running. In addition, improvements in fuel costs are being demanded recently and as a result power reductions are also be demanded with respect to swash plate type compressors.

Thus, in order to meet these demands, reducing the sliding surface area of a shoe has been proposed as a measure to reduce friction generated when the shoe and swash plate slide together. However, when the sliding surface area of a shoe is reduced in a swash plate type compressor disclosed in the patent document 1, surface pressure at the sections where the shoe and swash plate contacts increases. Consequently, a lack of lubrication between the shoe and swash plate are more likely to occur and a coating layer on the swash plate is more likely to wear.

In addition, the following problems occur when the sliding surface area of a shoe is reduced as in the swash plate disclosed in the patent document 2. That is, cracks are generated in the ring shaped grooves and ring shaped peaks when an impact load is applied to the ring shaped grooves and ring shaped peaks via a shoe as is shown in FIG. 6 and the coating layer is peeled away. Also, when the ring shape grooves and ring shaped peaks of the coating layer are deformed due to sliding with the shoe, the sliding surface area of the shoe and coating layer increases causing further wear of the ring shaped grooves and ring shaped peaks and finally disappear altogether. Furthermore, the ring shape grooves and ring shaped peaks sometimes disappear when objects such abrasion powder etc enter and move around within the ring shaped grooves. As a result, although the swash plate disclosed in the patent document 2 has good affinity it has the disadvantage that the coating layer is easy to wear when surface pressure which affects the swash plate via the shoe is high and the ability to retain lubrication is easily lost.

Means for Solving the Problems

For solving the problems described above, the present invention is a sliding component including a base and a coating layer formed on a surface of the base, the coating layer forming a sliding surface which slides with a movable component wherein the coating layer is formed from a honeycomb structured resin coating wherein multiple cylinder bodies are fabricated as one body on a surface of the base, the sliding surface is formed by an edge part of an aperture side of each of the cylinder bodies, and the interior space of each cylinder body acts as a storage part for lubrication and a container part for containing foreign objects.

Effects of the Invention

According to the structure described above, because a coating layer is formed from resin having a honeycomb structure it is possible to control wear of the resin coating even under a high pressure state. In addition, the interior space of each cylinder body acts as a lubrication storage part and foreign objects are contained in the interior space of each cylinder body. As a result, it is possible to provide a sliding component having good seizure resistance, lubrication retention and capture of foreign objects.

DESCRIPTION OF EMBODIMENTS

Figure 1:
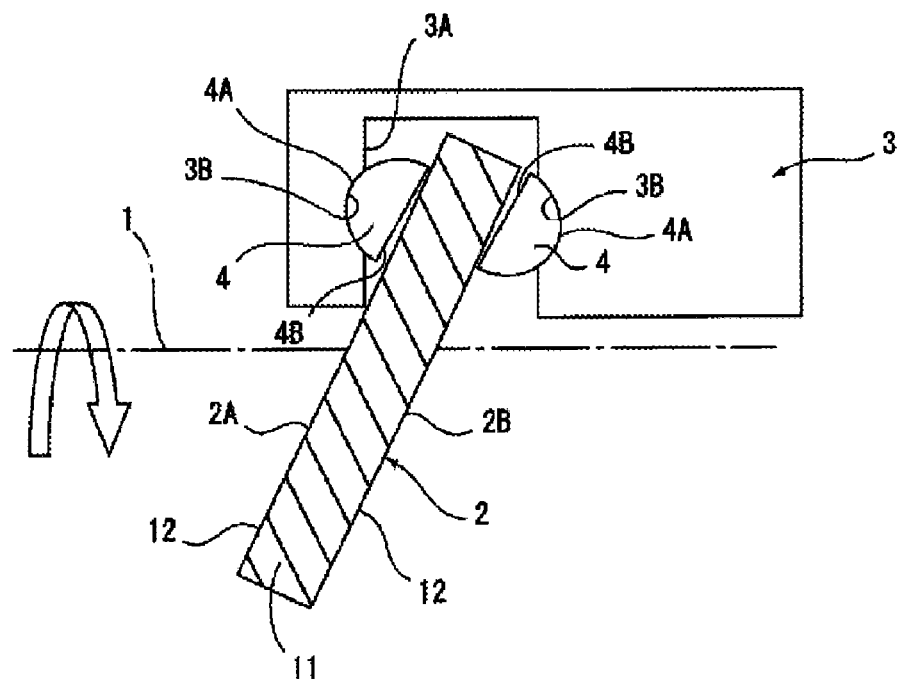
FIG. 1 is a cross sectional diagram of the main components illustrating one embodiment of the present invention.

The present invention is explained below using exemplified embodiments. FIG. 1 shows the main components of a swash plate type compressor. The swash plate type compressor is arranged with a swash plate 2 as a sliding component arranged at an angle on a periphery part of a rotation shaft 1, a plurality of pistons 3 arranged along the rotation shaft 1 enclosing an exterior periphery part of the swash plate 2 by a notch part 3A at one end, and a plurality of semispherical shoes 4 arranged between a pair of semispherical recessed parts 3B, 3B formed within the notch part 3A of each piston 3 and a surface 2A and rear surface 2B of the swash plate 2. The semispherical shoe 4 is arranged with a semispherical surface 4A which interlocks with the recessed part 3B of the piston 3, and a flat end surface 4B which slides with the surface 2A or rear surface 2B of the swash plate 2. The shoe 4 is comprised from SUJ2 and is finish processed after being tempered to the semispherical surface 4A and end surface 4B.

In addition, when the swash plate 2 rotates with the rotation of the rotation shaft 1, the surface 2A or the rear surface 2B of the swash plate 2 and the end surface 4B of a pair of shoes 4 slide together, the semispherical surface 4A of the pair of shoes 4 and the recessed parts 3B, 3B of the piston 3 also slide together and each piston 3 undergoes a reciprocating motion along the axial direction of the rotation shaft 1.

Figure 2:
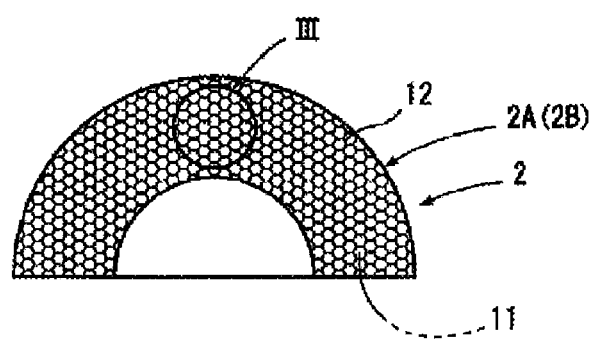
FIG. 2 is a front elevated view diagram of the main components in FIG. 1.
Figure 3:
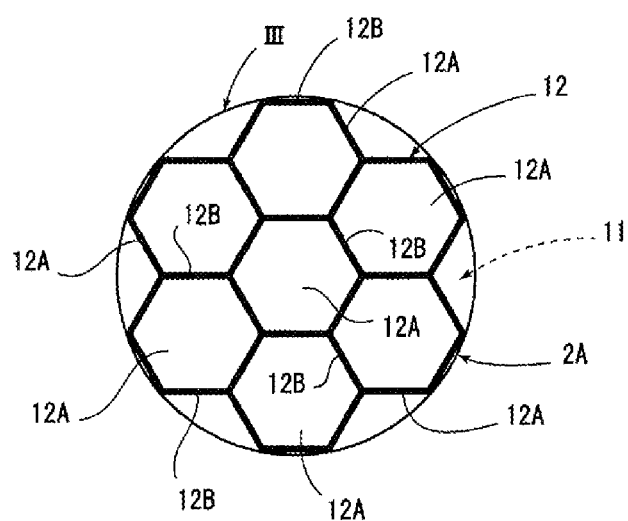
FIG. 3 is an expanded view diagram of the interior of a circle indicated by the arrow III in FIG. 2.
Figure 4:
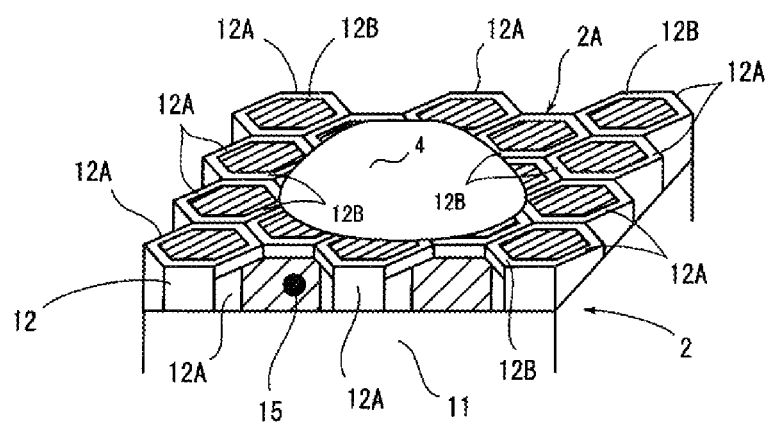
FIG. 4 is an oblique view diagram which exemplary shows an expanded view of the main components in FIG. 1.

Then, the present embodiment is characterized by improving the surface 2A and rear surface 2B of the swash plate 2 as a sliding component in the manner described below and improving the sliding properties of the surface 2A and rear surface 2B which become sliding surfaces. That is, as is shown in FIG. 2 to FIG. 4, the swash plate 2 of the present embodiment is comprised from a disc shaped iron base 11 and a resin coating 12 comprised from a honeycomb structure is formed on the entire surface and rear surface of the base 11.

The resin coating 12 has a structure in which multiple cylinder bodies 12A having a hexagonal cylinder shape are fabricated in sequence as one body, and an edge part 12B which becomes an aperture end of each cylinder body 12A are all at the same plane. In addition, the surface 2A and rear surface 2B which are sliding surfaces are formed by the edge part 12B of each cylinder body 12A. In addition, the interior space of each cylinder body 12A acts as a storage part for accumulating lubrication. As a result, lubrication which is supplied between the shoe 4 and swash plate 2 accumulates in the interior space of each cylinder body 12A and the interior space of each cylinder body 12A may also function as a container for storing foreign objects 15 such as abrasion powder.

In the present embodiment, the resin coating 12 which includes the honeycomb structure described above is manufactured by screen printing on the surface and rear surface of the base 11. Apart from screen printing, pad printing, roll printing, spray coating or dipping methods are also be used as the manufacturing method of the resin coating 12 including the honeycomb structure described above.

A thermoset resin including a solid lubricant and/or hard particles for example can be used as the material of the resin coating 12. One or more materials selected from $MoS_2$, black lead/graphite, $WS_2$, h-BN, a fluororesin such as PTFE, $CF$ can be used as the solid lubricant, one or more materials selected from an oxide (silica, alumina), nitride (SiN), carbide (SiC), sulfide (ZnS) can be used as the hard particles and one or more materials selected from PA I, PI can be used as the thermoset resin.

In addition, the thickness of the resin coating 12 is preferred to be about 2~50 μm, the thickness of the interval between cylinder bodies 12A is preferred to be about 0.25~0.5 mm as the size of a single cylinder body 12A and the size of the polygonal circumcircle which links center parts in the thickness direction of the intervals is preferred to be about 0.1~2 mm.

As described above, the surface 2A and rear surface 2B which become the sliding surfaces of the swash plate 2 are comprised from an edge part 12B of the resin coating 12 having a honeycomb structure. As a result, the surface 2A or rear surface 2B of the swash plate 2 and the end surface of the shoe 4 slide together and the area of the sliding surfaces of the swash plate 2 at positions which contact with the end surface 4B of the shoe 4 does not change even if wear of the edge part 12B of each cylinder body 12A which forms the sliding surfaces progresses. In other words, because wear of the sections of the surface 2A and rear surface 2B which slide with the shoe 4 is slow and uniform, it is possible to provide the swash plate 2 of the present embodiment with stable sliding properties.

In addition, the resin coating 12 has a structure in which multiple hexagonal cylinder bodies 12B are grouped together and the interior of each cylinder body 12A acts a storage part for lubrication. As a result, because it is possible to retain lubrication within the cylinder part 12A even if the swash plate 2 is rotating at high speed, it is difficult for a lack of lubrication to occur in the sliding surfaces, surface 2A and rear surface 2B. Therefore, according to the present embodiment, it is possible to provide a swash plate 2 which excellent wear resistance.

In addition, the interior space of each cylinder body 12A also functions as a storage part for storing foreign objects 15. That is, in the case where foreign objects 15 such as fine abrasion powder enter between the end surface 4B of the shoe 4 and the surface 2A and rear surface 2B of the swash plate 2, foreign objects 15 which become contained in the interior part of any one of the cylinder bodies 12B (see FIG. 4). As a result, because it is possible to prevent foreign particles from rolling and moving between the end surface 4B of the shoe 4 and the surface 2A and rear surface 2B of the swash plate 2, it is possible to control damage caused by foreign objects to the end surface 4B, surface 2A and rear surface 2B of the swash plate 2. Therefore, it is possible to improve wear resistance and durability of the swash plate 2 and thus provide a swash plate type compressor with a high level of wear resistance and durability.

Figure 5:
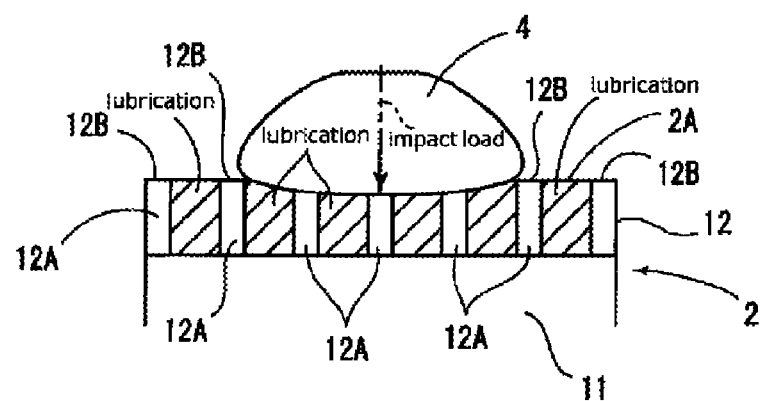
FIG. 5 is a vertical cross sectional view diagram of the main components of FIG. 4.
Figure 6:
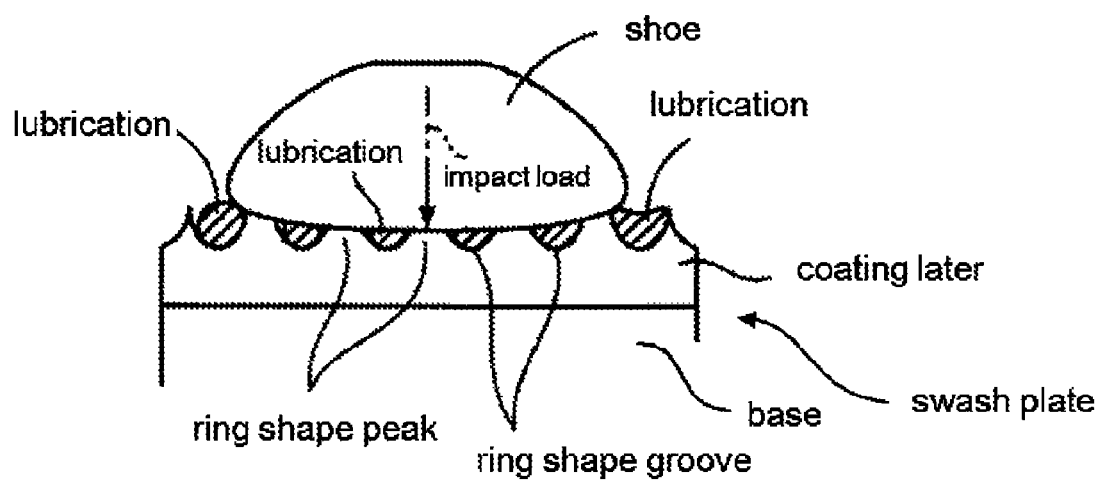
FIG. 6 is a vertical cross sectional view diagram which exemplary shows the conventional technology.

Furthermore, in the case where the end surface 4B of the shoe 4 is strongly compressed by the surface 2A or rear surface 2B of the swash plate 2 and an impact load is applied to the swash plate 2 during high speed rotation, it is possible to absorb this impact load by the resin coating 12 comprised of the honeycomb structure, and lubrication is promoted when the lubrication exudes from the cylinder body 12A due to flexible transformation of the resin coating 12 (see FIG. 5). As a result, it is possible to control wear and tear of the resin coating 12 due to impact loads and control cracks occurring in the resin coating 12 due to impact loads. Therefore, according to the present embodiment, it is possible to provide a swash plate 2 with excellent sliding properties as described above.

Furthermore, although the resin coating 12 of the embodiment described above has a honeycomb structure wherein hexagonal cylinder bodies 12A are continuously fabricated, the resin coating 12 having a structure where triangular cylinder shaped bodies or roughly circular cylinder shaped bodies are continuously fabricated may also be used.

Furthermore, the edge part 12B of the cylinder body 12A has an R shape or is beveled since this is preferred from the viewpoint of preventing wear, chipping or peeling of the resin coating 12.

Furthermore, although the embodiments described above explain the present invention in the case of application to a swash plate 2 of a swash plate type compressor, needless to say the present invention can also be applied to a thrust washer or thrust bearing as a sliding component.

REFERENCE SIGNS LIST

2 Swash Plate (sliding component)
2A Surface
2B Rear Surface
4 Shoe
11 Base
12 Resin Coating
12A Cylinder Body

The invention claimed is:

1. A sliding component comprising:
    a base; and
    a coating layer formed on a surface of the base, the coating layer forming a sliding surface which slides with a movable component:
    wherein
    the coating layer is formed from a honeycomb structured resin coating wherein multiple cylinder bodies are fabricated as one body on a surface of the base;
    the sliding surface is formed by an edge part of an aperture side of each of the cylinder bodies; and
    the interior space of each cylinder body acts as a storage part for lubrication and a container part for containing foreign objects.

2. The sliding component according to claim 1, wherein the sliding component is a swash plate of a swash plate type compressor or a thrust washer or a thrust bearing.

3. The sliding component according to claim 1, wherein a material of the resin coating is comprised from a thermoset resin including a solid lubricant and/or hard particles wherein one or more materials selected from $MoS_2$, graphite, $WS_2$, h-BN, a fluororesin, and CF is used as the solid lubricant,
    one or more materials selected from an oxide, nitride, carbide, and sulfide is used as the hard particles,
    and one or more materials selected from PAI and PI is used as the thermoset resin.

* * * * *